US008438046B2

(12) United States Patent
Mahaney et al.

(10) Patent No.: US 8,438,046 B2
(45) Date of Patent: May 7, 2013

(54) METHOD FOR PROVIDING RETIREMENT INCOME USING MUTUAL FUND LONGEVITY INSURANCE

(75) Inventors: James I. Mahaney, Upper Montclair, NJ (US); James Andreano, Little Falls, NJ (US)

(73) Assignee: The Prudential Insurance Company of America, Newark, NJ (US)

( * ) Notice: Subject to any disclaimer, the term of this patent is extended or adjusted under 35 U.S.C. 154(b) by 2827 days.

(21) Appl. No.: 10/992,222

(22) Filed: Nov. 18, 2004

(65) Prior Publication Data

US 2006/0106698 A1 May 18, 2006

(51) Int. Cl.
*G06Q 40/00* (2012.01)

(52) U.S. Cl.
USPC .............................................. 705/4

(58) Field of Classification Search .................. None
See application file for complete search history.

(56) References Cited

U.S. PATENT DOCUMENTS

| | | | | |
|---|---|---|---|---|
| 5,966,693 | A | 10/1999 | Burgess | 705/4 |
| 6,625,582 | B2 | 9/2003 | Richman et al. | 705/35 |
| 2002/0087365 | A1 | 7/2002 | Kavanaugh | 705/4 |
| 2002/0091610 | A1 | 7/2002 | Smith | 705/36 |
| 2002/0169702 | A1 | 11/2002 | Eaton, Jr. et al. | 705/36 |
| 2002/0188540 | A1 | 12/2002 | Fay et al. | 705/36 |
| 2002/0194098 | A1 | 12/2002 | Stiff et al. | 705/36 |
| 2002/0198802 | A1 | 12/2002 | Koresko, V | 705/35 |
| 2003/0033172 | A1 | 2/2003 | Menke | 705/4 |
| 2003/0233301 | A1 | 12/2003 | Chen et al. | 705/36 |
| 2004/0030625 | A1 | 2/2004 | Rabson et al. | 705/36 |

FOREIGN PATENT DOCUMENTS

JP 020022027878 A 7/2002

OTHER PUBLICATIONS

Updegrave, W. "Creating a Retirement Paycheck", Money, New York; May 2004.*
PCT Notification of Transmittal of the International Search Report with attached PCT International Search Report and Written Opinion of the International Searching Authority in International Application No. PCT/US05/20828 filed Jun. 13, 2005 (5 pages), Mailed Mar. 1, 2007.
Milevsky, "Real Longevity Insurance With a Deductible: Introduction to Advanced-Life Delayed Annuities," Managing Retirement Assets Symposium (SoA), 2004 (19 pages).
Oster, "Some New Ways to Preserve Your Retirement," article from The Wall Street Journal, Nov. 18, 2004 (2 pages).

* cited by examiner

*Primary Examiner* — Olabode Akintola
(74) *Attorney, Agent, or Firm* — Baker Botts L.L.P.

(57) ABSTRACT

A method for providing retirement income using mutual fund longevity insurance is provided. A current or prospective retiree can purchase a mutual fund coupled with a longevity product. The longevity product insures against the early exhaustion or termination of the mutual fund, superannuation, or poor market performance of the mutual fund, and could be funded using a qualified annuity, a Roth Individual Retirement Annuity (IRA), or a non-qualified annuity to provide tax advantages. Retirement income is provided for the retiree beginning at retirement. During the life of the mutual fund, periodic withdrawals are taken from the mutual fund and invested in the longevity product. If the retiree reaches a threshold age, the retiree can choose to receive income from the longevity product. Optionally, if the retiree reaches the threshold age and sufficient income is available from the mutual fund, the retiree can continue to receive income from the mutual fund and delay receiving income from the longevity product until a later age. Income from the longevity product can be provided until the death of the retiree. A number of insurance options can be provided, including a pure insurance option, a partial insurance option, or a guaranteed payback option.

20 Claims, 3 Drawing Sheets

METHOD FOR PROVIDING RETIREMENT INCOME USING MUTUAL FUND LONGEVITY INSURANCE

BACKGROUND OF THE INVENTION

1. Field of the Invention

The present invention relates to a method for providing income for retirees. More specifically, the present invention relates to a method for providing retirement income using mutual fund longevity insurance.

2. Related Art

Presently, many retirees are discovering that they are outliving their retirement savings. This problem (referred to in retirement planning as "superannuation") is particularly burdensome where retirees are dependent upon defined contribution plans (e.g., 401(k) plans), as opposed to defined benefit plans (e.g., pensions), for retirement income. To avoid the risk of outliving retirement savings, many retirees significantly reduce their standards of living to extend the number of years that retirement savings will be available.

The immediate payout annuity represents a type of retirement planning product that has in the past been used to supplement retirement savings. With an immediate payout annuity, a purchaser liquidates or "rolls over" accumulated assets to make a lump sum annuity purchase. Annuity payments typically commence within one year from the date of payment. For example, if a 65-year-old single male desires to receive a monthly income of $3,000 for life with payments commencing immediately, the lump sum cost of the annuity using current pricing is approximately $430,000.00. However, immediate payout annuities suffer from a number of disadvantages. For example, many individuals are unwilling to relinquish control of large sums of investable assets by rolling over such assets into a single annuity. Further, by rolling assets into a single fixed annuity, the ability to participate in financial markets is eliminated, thereby precluding potential gains that could result had the assets been invested in such markets. Further, immediate annuity purchasers are at the mercy of market conditions at the time of purchase.

Other retirement planning approaches include structured withdrawals that are targeted to match a retiree's life expectancy and periodic fixed-dollar withdrawals that do not detract from principal. However, statistical analysis has projected that structured withdrawals are estimated to fail approximately 50 percent of the time for longer retirements, depending on assumed investment returns and expenses. Further, although periodic fixed-dollar withdrawals fail less frequently than structured withdrawals, failures still occur and it is often difficult for the retiree to properly know how much he or she can spend in the future.

Many individuals assume that they will not reach older ages in retirement, thus obviating the need to provide for retirement income at advanced ages. However, recent longevity statistics show that a large number of retirees will reach ages of 90 or older. For example, a 65-year-old woman has a 40 percent chance of living to age 90, a 20 percent chance of living to age 95, and a 5 percent chance of living to age 100. For married couples where both spouses are 65 years old, at least one of the spouses has a 57 percent chance of living to age 90, a 28 percent chance of living to age 95, and a 7 percent chance of living to age 100. Further, with future advances in medical science, life expectancies will most likely increase. Thus, there is an increasing need to provide retirement income at advanced retirement ages.

Longevity insurance has in the past been proposed as a potential solution for providing retirement income at advanced ages. Longevity insurance is provided in the form of an advanced-life delayed annuity that is adjusted for consumer price inflation. With this approach, the annuity is acquired at a young age and small premiums are paid over a long period of time. Inflation-adjusted income is provided at an advanced age (e.g., ages 80, 85, and 90). However, this approach does not couple the annuity with another product, such as a mutual fund, so that income from the mutual fund and investment gains produced by the mutual fund are automatically invested in the annuity for later use. Moreover, the conventional longevity insurance approach does not provide sufficient flexibility for distribution of assets after the death of the retiree, nor does conventional longevity insurance provide a mechanism for insuring against the early exhaustion of a retirement assets.

Accordingly, what would be desirable, but has not yet been provided, is a method for providing retirement income using mutual fund longevity insurance, wherein income for retirees is guaranteed at advanced ages and the potential is provided to accumulate wealth with equity and/or fixed income mutual funds.

SUMMARY OF THE INVENTION

The present invention provides a method of providing retirement income using mutual fund longevity insurance. A mutual fund coupled with a longevity product is purchased by a current or future retiree. The longevity product insures against the early exhaustion or termination of the mutual fund, superannuation, or poor market performance of the mutual fund, and could be a qualified annuity, a Roth Individual Retirement Annuity (IRA), or a non-qualified annuity to provide tax advantages. Income is provided from the mutual fund at retirement (e.g., age 65). Periodic deductions are taken from the mutual fund and invested in the longevity product. If the retiree reaches a threshold age (e.g., age 80), the retiree can choose to receive income from the longevity product. Optionally, if the retiree reaches the threshold age and sufficient income is available from the mutual fund, the retiree can continue to receive income from the mutual fund and delay receiving income from the longevity product until a later age. Income from the longevity product can be provided until the death of the retiree.

The present invention provides a method for providing retirement income for an individual. The method comprises the steps of purchasing a mutual fund coupled with a longevity product; periodically investing a portion of the mutual fund in the longevity product; receiving income from the mutual fund to provide retirement income when the individual retires; and receiving income from the longevity product to provide retirement income when the individual reaches a threshold age and until death.

In one embodiment, the present invention provides a method for providing retirement income for an individual, comprising the steps of purchasing a mutual fund coupled with a longevity product; periodically investing a portion of the mutual fund in the longevity product; receiving income from the mutual fund to provide retirement income when the individual retires; receiving income from the longevity product to provide retirement income when the individual reaches a threshold age and until death; and returning a remaining balance of the longevity product to an entity issuing the longevity product at the death of the individual.

In another embodiment, the present invention provides a method for providing retirement income for an individual, comprising the steps of purchasing a mutual fund coupled with a longevity product; periodically investing a portion of the mutual fund in the longevity product; receiving income from the mutual fund to provide retirement income when the individual retires; receiving income from the longevity product to provide retirement income when the individual reaches a threshold age and until death; and returning a remaining balance of the longevity product to heirs of the individual if the individual dies at an age less than the threshold age.

In another embodiment, the present invention provides a method for providing retirement income for an individual, comprising the steps of purchasing a mutual fund coupled with a longevity product; periodically investing a portion of the mutual fund in the longevity product; receiving income from the mutual fund to provide retirement income when the individual retires; receiving income from the longevity product to provide retirement income when the individual reaches a threshold age and until death; and returning a remaining balance of the longevity product to heirs of the individual at the death of the individual.

The present invention also provides a method for providing retirement income for an individual, comprising the steps of coupling a longevity product to a mutual fund; periodically deducting a portion of the mutual fund for the longevity product; disbursing funds from the mutual fund to provide retirement income when the individual retires; and disbursing funds from the longevity product to provide retirement income when the individual reaches a threshold age and until death.

BRIEF DESCRIPTION OF THE DRAWINGS

Other important objects and features of the invention will be apparent from the following Detailed Description of the Invention taken in connection with the accompanying drawings in which.

DETAILED DESCRIPTION OF THE INVENTION

The present invention provides a method for providing retirement income using mutual fund longevity insurance. A current or prospective retiree can purchase a mutual fund coupled with a longevity product. The longevity product insures against the early exhaustion or termination of the mutual fund, superannuation, or poor market performance of the mutual fund, and could be funded using a qualified annuity, a Roth Individual Retirement Annuity (IRA), or a non-qualified annuity to provide tax advantages. Retirement income is provided for the retiree beginning at retirement (e.g., age 65). During the life of the mutual fund, periodic withdrawals are taken from the mutual fund and invested in the longevity product. If the retiree reaches a threshold age (e.g., age 80), the retiree can choose to receive income from the longevity product. Optionally, if the retiree reaches the threshold age and sufficient income is available from the mutual fund, the retiree can continue to receive income from the mutual fund and delay receiving income from the longevity product until a later age. Income from the longevity product can be provided until the death of the retiree. A number of insurance options can be provided, including a pure insurance option, a partial insurance option, or a guaranteed payback option.

Figure 1:
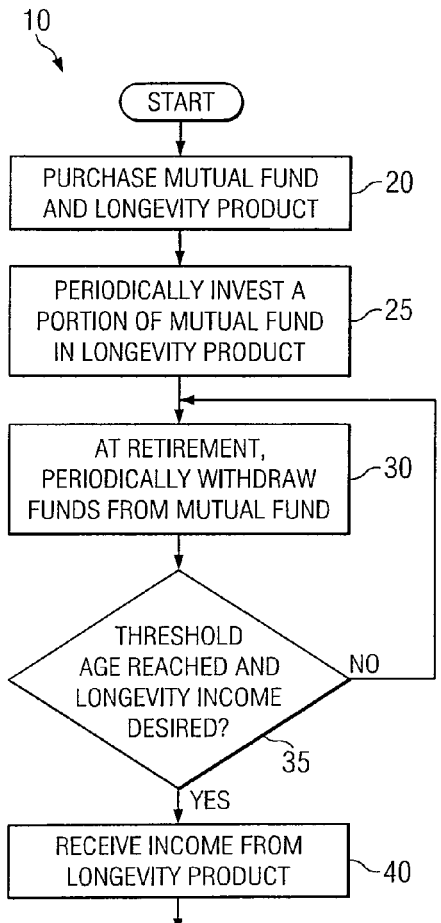
FIG. 1 is a flowchart showing the method according to the present invention for providing retirement income using mutual fund longevity insurance.

FIG. 1 is a flowchart showing the method according to the present invention for providing retirement income using mutual fund longevity insurance, indicated generally at 10. Beginning in step 20, a mutual fund and a longevity product coupled with the mutual fund are purchased by a current or future retiree. The mutual fund could be purchased with a one-time, lump-sum payment, or it could be funded through periodic payments over time. The longevity product insures against the early exhaustion or termination of the mutual fund, superannuation, or poor market performance of the mutual fund, and could be funded using a qualified annuity, a Roth Individual Retirement Annuity (IRA), or a non-qualified annuity to provide tax advantages.

The longevity product could be offered in the form of an insurance contact between a purchaser and an insurance entity. Income is provided for the retiree from the longevity product when the retiree reaches a threshold age (e.g., age 80). Preferably, the mutual fund has management fees that are lower than average traditional mutual fund management fees. For example, the Dryden S&P 500 mutual fund has a management fee of 65 basis points (0.0065%), and the average management fee for a mutual fund is 160 basis points (0.016%). The difference between the management fees and average traditional mutual fund management fees can be invested in the longevity product. The investment, however, can be more or less than this difference. As such, the mutual fund is used to fund the longevity product in a manner that is virtually unnoticeable to the retiree.

When the mutual fund and longevity product have been purchased, step 25 occurs, wherein a portion of the mutual fund is periodically deducted and invested in the longevity product. This investment could occur at any desired interval, e.g., weekly, bi-weekly, monthly, or as otherwise desired, and could occur automatically. The deduction from the mutual fund can occur prior to or after a retiree's retirement date, and invested in the longevity product. Preferably, taxes are paid on the deductions prior to investment in the longevity product, so that that the longevity product can grow tax-free. Optionally, the purchaser can contribute to the mutual fund at any desired time.

In step 30, when the purchaser has reached retirement age (e.g., age 65), funds are periodically withdrawn from the mutual fund to provide retirement income. The withdrawals could occur on a weekly, bi-weekly, or monthly basis, or as otherwise desired. Then, in step 35, a determination is made as to whether the purchaser has reached a threshold age, and whether the purchaser desires to withdraw income from the longevity product. The threshold age could be any desired age, such as age 80. Optionally, the purchaser could choose to defer receiving income from the longevity product until an age greater than the threshold age, in which case the value of longevity product payments would increase. If a negative determination is made, step 30 is repeated so that funds are periodically withdrawn from the mutual fund. If a positive determination is made in step 35, step 40 occurs, wherein retirement income is received from the longevity product until death. The income from the longevity product could be provided in addition to income from the mutual fund. Importantly, if the mutual fund has been exhausted and the retiree reaches the threshold age, the longevity product provides income to the retiree until death, thereby insuring against superannuation and/or exhaustion of the mutual fund. Thus, retirement income is provided for retirees at advanced ages.

Figure 2:
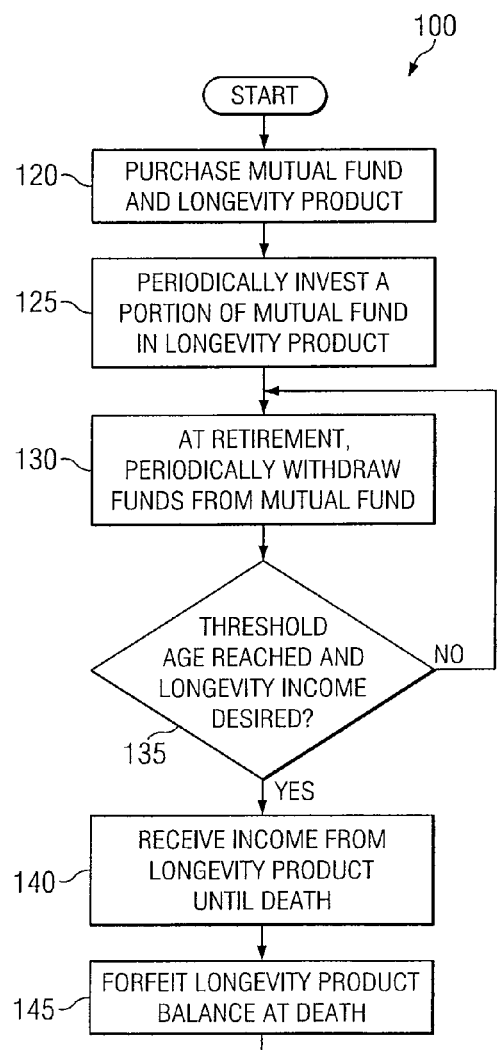
FIG. 2 is a flowchart showing an alternate embodiment of the method of the present invention, wherein a pure insurance option is provided.

FIG. 2 is a flowchart showing an alternate embodiment of the method of the present invention, indicated generally at 100, wherein a pure insurance option is provided. This option allows income to be provided to a retiree at advanced ages and until the retiree's death. At death, any remaining balance in the longevity product is forfeited and retained by the entity responsible for issuing and/or managing the longevity product, such as an insurance company. Beginning in step 120, a mutual fund coupled with a longevity product is purchased. When the mutual fund and longevity product have been purchased, step 125 occurs, wherein a portion of the mutual fund is periodically deducted and invested in the longevity product. This investment could occur at any desired interval, e.g., weekly, bi-weekly, monthly, or as otherwise desired, and could occur automatically. Further, this investment could occur before or after a purchaser's retirement date. Preferably, taxes are paid on the deductions prior to investment in the longevity product, so that that the longevity product can grow tax-free. Optionally, the purchaser can contribute to the mutual fund at any desired time.

In step 130, when the purchaser has reached retirement age (e.g., age 65), funds are periodically withdrawn from the mutual fund to provide retirement income. The withdrawals could occur on a weekly, bi-weekly, or monthly basis, or as otherwise desired. Then, in step 135, a determination is made as to whether the purchaser has reached a threshold age at which to start drawing income from the longevity product, and whether the purchaser desires to receive income from the longevity product. The threshold age could be any desired age, such as age 80. Optionally, the purchaser could choose to defer receiving income from the longevity product until an age greater than the threshold age, in which case the value of longevity product payments would increase. If a negative determination is made, step 130 is repeated so that funds are periodically withdrawn from the mutual fund. If a positive determination is made in step 135, step 140 occurs, wherein retirement income is received from the longevity product until death. The income from the longevity product could be provided in addition to income from the mutual fund. Importantly, if the mutual fund has been exhausted and the retiree reaches the threshold age, the longevity product provides income to the retiree until death, thereby insuring against superannuation and/or exhaustion of the mutual fund. Then, in step 145, any remaining balance in the longevity product is forfeited at the retiree's death. Any remaining balance in the mutual fund is passed to the purchaser's heirs.

Figure 3:
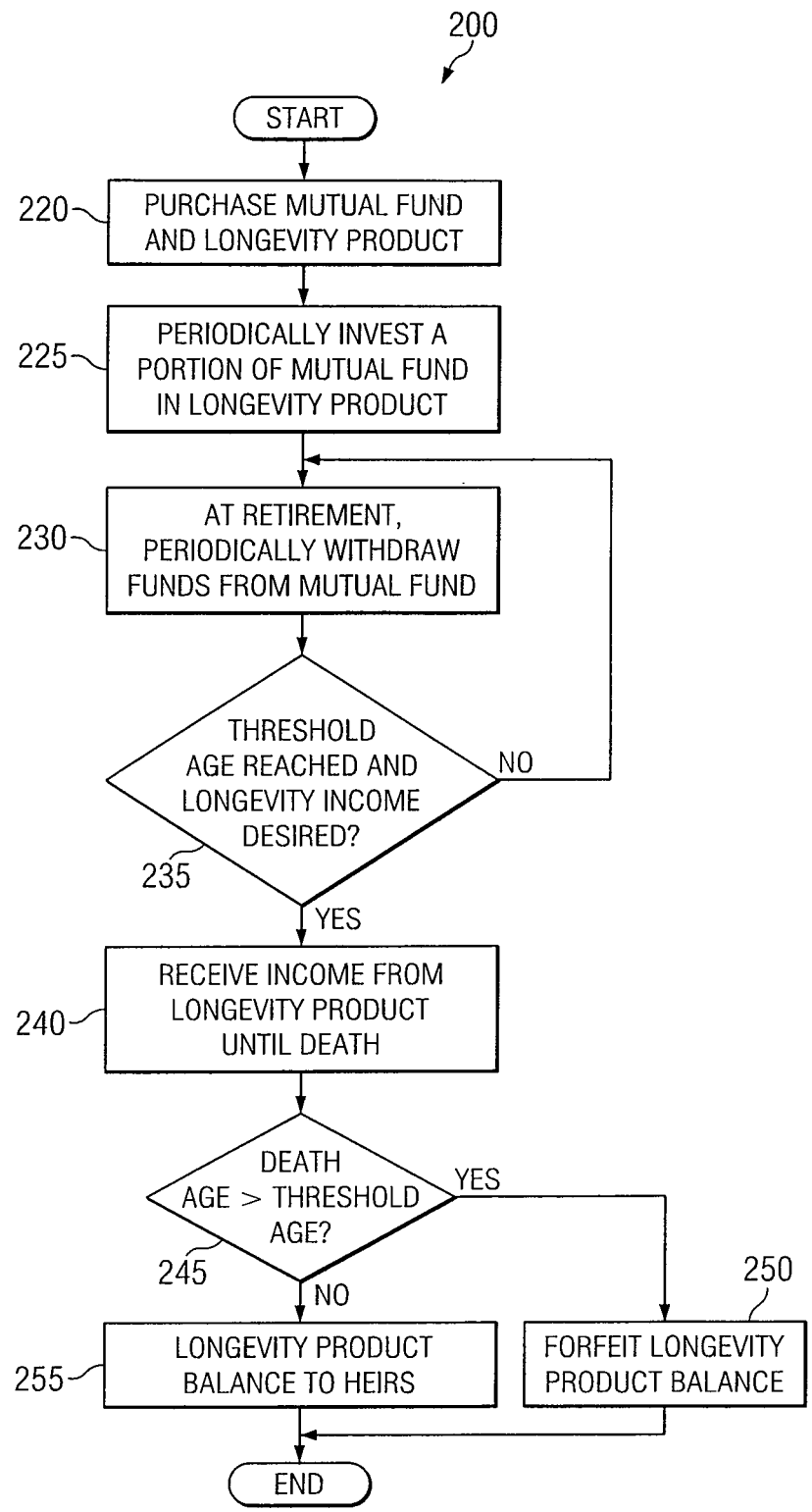
FIG. 3 is a flowchart showing an alternate embodiment of the method of the present invention, wherein a partial insurance option is provided.

FIG. 3 is a flowchart showing an alternate embodiment of the method of the present invention, indicated generally at 200, wherein a partial insurance option is provided. This option is similar to the pure insurance option discussed earlier with respect to FIG. 2, such that income is provided to a retiree at advanced ages and until the retiree's death. However, at the retiree's death, the balance of the longevity product can be passed to heirs of the retiree only if the retiree's age at death is greater than a threshold age (e.g., age 80). Beginning in step 220, a mutual fund coupled with a longevity product is purchased. When the mutual fund and longevity product have been purchased, step 225 occurs, wherein a portion of the mutual fund is periodically deducted and invested in the longevity product. This investment could occur at any desired interval, e.g., weekly, bi-weekly, monthly, or as otherwise desired, and could occur automatically. Further, this investment could be made before or after a purchaser's retirement date. Preferably, taxes are paid on the deductions prior to investment in the longevity product, so that that the longevity product can grow tax-free. Optionally, the purchaser can contribute to the mutual fund at any desired time.

In step 230, when the purchaser has reached retirement age (e.g., age 65), funds are periodically withdrawn from the mutual fund to provide retirement income. The withdrawals could occur on a weekly, bi-weekly, or monthly basis, or as otherwise desired. Then, in step 235, a determination is made as to whether the purchaser has reached a threshold age at which to start drawing income from the longevity product, and whether the purchaser desires to withdraw income from the longevity product. The threshold age could be any desired age, such as age 80. Optionally, the purchaser could choose to defer receiving income from the longevity product until an age greater than the threshold age, in which case the value of longevity product payments would increase. If a negative determination is made, step 230 is repeated so that funds are periodically withdrawn from the mutual fund to provide retirement income. If a positive determination is made in step 235, step 240 occurs, wherein retirement income is received from the longevity product until death. The income from the longevity product could be provided in addition to income from the mutual fund. Importantly, if the mutual fund has been exhausted and the retiree reaches the threshold age, the longevity product provides income to the retiree until death, thereby insuring against superannuation and/or exhaustion of the mutual fund.

In step 245, a determination is made as to whether the purchaser's age at death is greater than the threshold age. If a positive determination is made, step 250 occurs, wherein the remaining balance of the longevity product is returned to the entity responsible for issuing or managing the longevity product, such as an insurance company. If a negative determination is made, step 255 occurs, wherein the balance of the longevity product is passed to the purchaser's heirs. Thus, the present invention provides a partial insurance option for the longevity product, so that income is provided to the purchaser's heirs if the purchaser dies before the threshold age. Any remaining balance in the mutual fund is passed to the purchaser's heirs.

Figure 4:
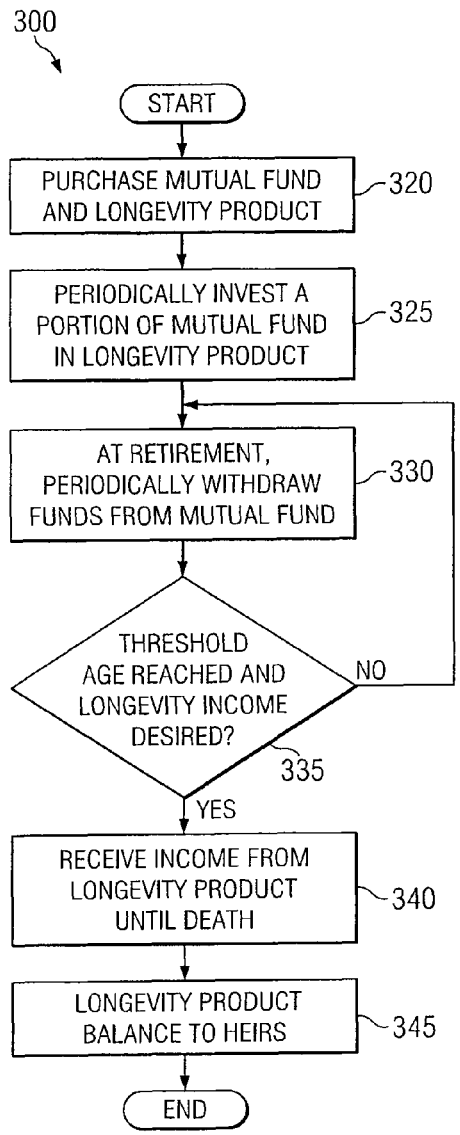
FIG. 4 is a flowchart showing an alternate embodiment of the method of the present invention, wherein a guaranteed payback option is provided.

FIG. 4 is a flowchart showing an alternate embodiment of the method of the present invention, indicated generally at 300, wherein a guaranteed payback option is provided. This option is similar to the pure insurance option discussed earlier with respect to FIG. 2, such that income is provided to a retiree at advanced ages and until the retiree's death. However, at the retiree's death, the balance of the longevity product is guaranteed to pass to the retiree's heirs regardless of the retiree's age at death. Beginning in step 320, a mutual fund coupled with a longevity product is purchased. When the mutual fund and longevity product have been purchased, step 325 occurs, wherein a portion of the mutual fund is periodically deducted and invested in the longevity product. This investment could occur at any desired interval, e.g., weekly, bi-weekly, monthly, or as otherwise desired, and could occur automatically. Further, this investment could occur before or after the purchaser's retirement date. Preferably, taxes are paid on the deductions prior to investment in the longevity product, so that that the longevity product can grow tax-free. Optionally, the purchaser can contribute to the mutual fund at any desired time.

In step 330, when the purchaser has reached retirement age (e.g., age 65), funds are periodically withdrawn from the mutual fund to provide retirement income. The withdrawals could occur on a weekly, bi-weekly, or monthly basis, or as otherwise desired. Then, in step 335, a determination is made as to whether the purchaser has reached a threshold age at which to start drawing income from the longevity product, and whether the purchaser desires to receive income from the longevity product. The threshold age could be any desired age, such as age 80. Optionally, the purchaser could choose to defer receiving income from the longevity product until an age greater than the threshold age, in which case the value of longevity product payments would increase. If a negative determination is made, step 330 is repeated so that funds are periodically withdrawn from the mutual fund. If a positive determination is made in step 335, step 340 occurs, wherein retirement income is received from the longevity product until death. The income from the longevity product could be provided in addition to income from the mutual fund. Importantly, if the mutual fund has been exhausted and the retiree reaches the threshold age, the longevity product provides income to the retiree until death, thereby insuring against superannuation and/or exhaustion of the mutual fund. Then, in step 345, any remaining balance in the longevity product is passed to the heirs of the purchaser. Any remaining balance in the mutual fund is also passed to the purchaser's heirs.

Figure 5:
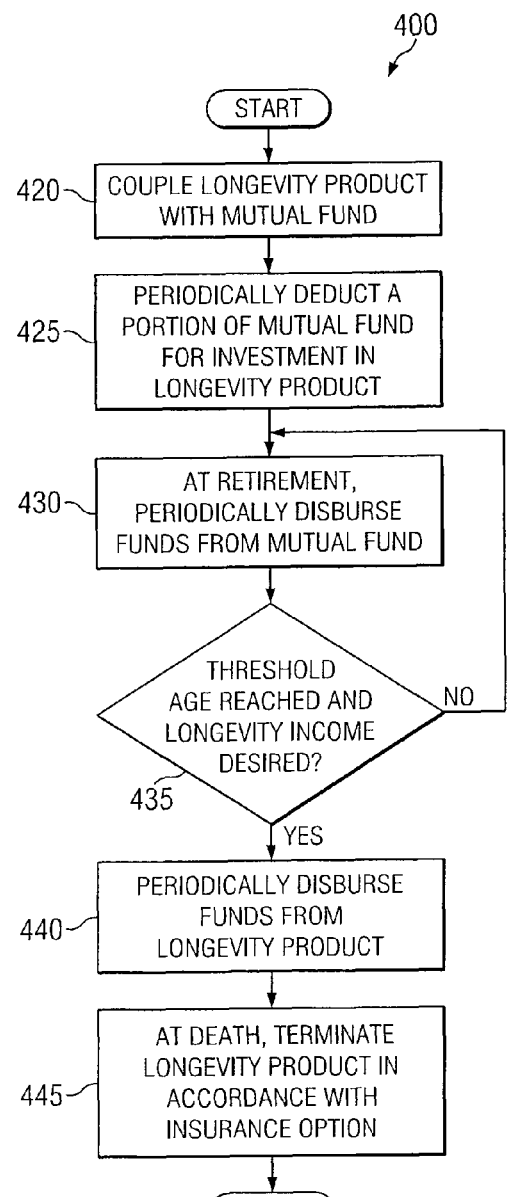
FIG. 5 is a flowchart showing the method according to the present invention for providing retirement income using mutual fund longevity insurance, from the perspective of an insurance entity.

FIG. 5 is a flowchart showing the method according to the present invention, indicated generally at 400, for providing retirement income using mutual fund longevity insurance, from the perspective of an insurance entity. In step 420, an entity, such as an insurance entity or any other entity, couples a mutual fund with a longevity product. The mutual fund could be provided by the entity, or by a separate entity. Then, in step 425, the entity periodically deducts a portion of the mutual fund for investment in the longevity product. Such periodic deductions continue until the purchaser reaches retirement age (e.g., age 65), and could occur at any desired interval, e.g., weekly, bi-weekly, or monthly. Further, the investment could occur before or after the purchaser's retirement date.

In step 430, at the retirement of a purchaser, the entity periodically disburses funds from the mutual fund to the purchaser to provide retirement income. The disbursements could occur at any desired interval, e.g., weekly, bi-weekly, or monthly. In step 435, a determination is made as to whether the purchaser reaches a threshold age (e.g., age 80), and whether the purchaser desires to receive income from the longevity product. Optionally, the purchaser could choose to defer receiving income from the longevity product until an age greater than the threshold age, in which the value of longevity product payments would increase. If a negative determination is made, step 430 is repeated so that periodic disbursements are continued from the mutual fund to provide retirement income. If a positive determination is made in step 435, step 440 occurs, wherein retirement income is received from the longevity product until death. The income from the longevity product could be provided in addition to income from the mutual fund. Importantly, if the mutual fund has been exhausted and the retiree reaches the threshold age, the longevity product provides income to the retiree until death, thereby insuring against superannuation and/or exhaustion of the mutual fund. At the purchaser's death, step 445 occurs, wherein the entity terminates the longevity product in accordance with an insurance option. The insurance option could comprise the pure insurance option, partial insurance option, and guaranteed payback option discussed earlier with reference to FIGS. 2-4.

Having thus described the invention in detail, it is to be understood that the foregoing description is not intended to limit the spirit and scope thereof. What is desired to be protected by Letters Patent is set forth in the appended claims.

What is claimed is:

1. An automated method for providing retirement income for an individual in accordance with a retirement product, the retirement product comprising a longevity product coupled with a mutual fund, the automated method comprising:
   on a periodic basis, automatically investing, by one or more computers, a portion of the mutual fund in the longevity product;
   determining, by the one or more computers, that the individual has reached a first age, and in response, distributing income from the mutual fund to provide a first retirement income; and
   determining, by the one or more computers, that the individual has reached a second age, and in response, distributing income from the longevity product to provide a second retirement income until death.

2. The automated method of claim 1, wherein the automatically investing, on a periodic basis, a portion of the mutual fund in the longevity product is virtually unnoticeable to the individual.

3. The automated method of claim 2, wherein the automatically investing occurs monthly.

4. The automated method of claim 1, further comprising receiving funds from the individual to contribute to the mutual fund.

5. The automated method of claim 1, wherein the longevity product comprises a non-qualified annuity.

6. The automated method of claim 1, wherein the longevity product comprises a Roth IRA.

7. The automated method of claim 1, wherein the longevity product comprises a qualified annuity.

8. The automated method of claim 1, wherein the one or more computers are further operable to deduct a tax amount from the portion of the mutual fund prior to automatically investing the portion of the mutual fund in the longevity product.

9. The automated method of claim 1, wherein distributing income from the longevity product to provide the second retirement income comprises distributing the income until death when the individual reaches the second age and the mutual fund is exhausted.

10. The automated method of claim 1, further comprising deferring distribution of the second retirement income until the individual reaches an age greater than the second age.

11. A method for providing retirement income for an individual in accordance with a retirement product, the retirement product comprising a longevity product coupled with a mutual fund, the method comprising:
   offering the retirement product to the individual, wherein the retirement product provides for distributing a first retirement income from the mutual fund when the individual reaches a first age and a second retirement income from the longevity product when the individual reaches a second age and until death;
   receiving, by one or more computers, an indication that the retirement product has been purchased; and
   on a periodic basis, automatically investing, by the one or more computers, a portion of the mutual fund in the longevity product.

12. The method of claim 11, wherein the automatically investing, on a periodic basis, a portion of the mutual fund in the longevity product is virtually unnoticeable to the individual.

13. The method of claim 12, wherein the automatically investing occurs monthly.

14. The method of claim 11, further comprising receiving funds from the individual to contribute to the mutual fund.

15. The method of claim 11, wherein the longevity product comprises a non-qualified annuity.

16. The method of claim 11, wherein the longevity product comprises a Roth IRA.

17. The method of claim 11, wherein the longevity product comprises a qualified annuity.

18. The method of claim 11, wherein the one or more computers are further operable to deduct a tax amount from the portion of the mutual fund prior to automatically investing the portion of the mutual fund in the longevity product.

19. The method of claim 11, wherein distributing income from the longevity product to provide the second retirement income comprises distributing the income until death when the individual reaches the second age and the mutual fund is exhausted.

20. The method of claim 11, wherein the retirement product provides for deferring distribution of the second retirement income until the individual reaches an age greater than the second age.

\* \* \* \* \*